United States Patent

Kitch

[15] 3,640,613
[45] Feb. 8, 1972

[54] TRANSPARENCY DISPLAY APPARATUS

[72] Inventor: Paul E. Kitch, West Springfield, Mass.
[73] Assignee: Scott Paper Company, Delaware County, Pa.
[22] Filed: Jan. 9, 1970
[21] Appl. No.: 10,117

Related U.S. Application Data

[62] Division of Ser. No. 625,841, Mar. 24, 1967, Pat. No. 3,536,393.

[52] U.S. Cl..................................................353/23
[51] Int. Cl.....................................................G03b 21/00
[58] Field of Search................353/120, 23, 98, 99; 40/106.1

[56] References Cited

UNITED STATES PATENTS

| 3,398,636 | 8/1968 | MacLachlan | 353/122 X |
| 3,438,702 | 4/1969 | Milhaupt et al. | 353/35 |
| 3,438,703 | 4/1969 | Winnemann | 353/120 |

*Primary Examiner*—Harry N. Haroian
*Attorney*—William J. Foley and John W. Kane, Jr.

[57] ABSTRACT

Transparency display apparatus is disclosed including a transparency storage device for protecting transparencies during transport and for facilitating display of transparencies upon an overhead projector and a staging assembly mountable on the stage of an overhead projector and cooperating with the storage device for transparency display. The storage device is separable from the staging assembly during transport of the transparencies and is constructed in a manner which fully protects the transparencies by providing covers and sides which form a package for holding the transparencies. When utilized for displaying transparencies, the storage device may be opened up and the covers pivoted out of place into a position where they support transparencies before and after display. The staging assembly includes fastener means which cooperate with fasteners on the storage device so that the storage device is supported while the transparencies are being displayed. The staging assembly has a transparent panel positioned above a light source and relative to the storage device so that transparencies carried in the storage device can be pivoted about their point of attachment to the storage device for selective display over the transparent panel on the overhead projector. The staging assembly also includes supports adjacent the transparent panel for supporting the covers of the storage device in a position where transparencies can be collected and disposed upon one of them before and after display. Individual transparencies retained in the apparatus may be moved about an axis lying in the plane of the transparency as well as about an axis intersecting the plane of the transparency, generally one perpendicular thereto.

4 Claims, 4 Drawing Figures

INVENTOR.
PAUL E. KITCH
BY Stanton T. Hadley
ATTORNEY.

INVENTOR.
PAUL E. KITCH

TRANSPARENCY DISPLAY APPARATUS

This application is a division of U.S. Pat. application Ser. No. 625,841, now U.S. Pat. No. 3,536,393, filed Mar. 24, 1967 entitled TRANSPARENCY DISPLAY APPARATUS.

BACKGROUND OF THE INVENTION

1. Field of the Invention

This invention relates to improvements in transparency display apparatus and, more particularly, to a transparency storage device and to display apparatus including a transparency storage device and a staging assembly.

2. Description of the Prior Art

In the past, a number of systems have been proposed for providing transparencies in the form of a booklet or other arrangement which would allow their display on an overhead projector. Due to the manner in which such booklets are constructed, it is not possible to conveniently handle the transparencies so that certain transparencies of the group can be selectively displayed out of the order in which they appear in the booklet. Other systems for handling and storing transparencies which allow their selective display on an overhead projector involve devices which are not convenient to transport and store the transparencies between viewings. For example, many of these types necessitate the separate handling of individual transparencies which are not fastened together in an integral package.

One type of transparency display apparatus is disclosed in U.S. Pat. No. 3,253,358, issued May 31, 1966, to J. S. Wright. One of the shortcomings of the apparatus disclosed therein is the inability to conveniently alter the order in which individual transparencies in the booklet are displayed. Another type of apparatus for handling transparencies is disclosed in U.S. Pat. No. 3,264,936, issued Aug. 9, 1966, to B. V. Schultz et al. While the apparatus disclosed in this patent allows the order in which the transparencies are displayed to be varied, the apparatus does not securely retain the transparencies in an integral group. Rather they are gathered together and placed loosely in a pocket from which they are removed for display on the stage of a projector.

A still further embodiment of apparatus of this type is disclosed in U.S. Pat. No. 3,279,109, issued Oct. 18, 1966, to W. Whittum. This apparatus provides no means for protecting the transparencies during transport and has the further shortcoming of attaching the transparencies to one another in a manner which prevents their selective display in a convenient manner.

In apparatus of this type, it is believed to be desirable to provide some means to retain the transparencies in a protected condition in an integral group for storage and transport. Generally, such transparencies should be arranged and contained in integral packages or groups when they are used to cover a certain subject, as in their use as teaching aids. It is generally preferred that they be kept in a predetermined sequential order. It is also important that some means be provided for registering one transparency relative to another during viewing when it is desired to progressively build up an image by superimposition.

SUMMARY OF THE INVENTION

The present invention is transparency display apparatus which includes a transparency storage device and a staging assembly. The transparency storage device facilitates the transport and storage of transparencies when they are not being displayed and also facilitates the display of such transparencies on an overhead projector in a manner which is much more convenient and flexible than was possible in the past. The transparency display apparatus of the invention includes a staging assembly portion which is adapted to be positioned above the light source on an overhead projector. The transparency storage device is arranged for attachment to the staging assembly in a manner which facilitates display of transparencies on the overhead projector.

Thus, means are provided on the staging assembly to cooperatively support the covers of the storage device after it is opened and arranged for display. Transparencies carried in the storage device can be pivoted about their point of attachment to the storage device and selectively placed either in a position on the staging assembly in which they form an image which is projected on a screen by the overhead projector or in a position of rest on one of the covers of the storage device. With this arrangement, the order of the transparencies is maintained and the transparencies are kept in a single group but the order of display on the overhead projector may be altered at the wish of the operator.

It is an object and advantage of the invention to provide transparency display apparatus including a transparency storage device and a staging assembly which facilitates the display of transparencies upon an overhead projector.

It is an additional object and advantage of the invention to provide a new and improved transparency storage device adapted to protect transparencies during transport and storage and to facilitate their display upon an overhead projector.

These and other objects and advantages of the invention are provided by transparency display apparatus including a staging assembly having a transparent panel adapted to be positioned over the light source of an overhead projector. The panel includes alignment means along at least a portion of its periphery which serve to register transparencies disposed thereon in superimposing relationship by edge contact with the transparencies. The transparent panel also includes support means extending from the peripheral sides of the panel which serve to support the covers of a transparency storage device, to be described, when the device is opened for display purposes. Attachment means are provided on the support means to releasably secure the transparency storage device thereto by engagement with one cover thereof.

The transparency storage device has a top cover and a bottom cover which are disposed in superimposed spaced relationship. First fastener means are provided for securing the top cover to the bottom cover at a point peripherally spaced from the first fastener means. In some embodiments, the storage device includes second fastener means for releasably securing the top cover to the bottom cover at least one point about the periphery of the bottom cover. The first fastener means are adapted to secure the top cover to the bottom cover while the top cover is overturned and moved out of superimposed relationship with the bottom cover when the second fastener means are released. The transparencies are secured in the storage device by the first fastener means in a manner permitting the transparencies to be overturned, selectively displayed on the staging assembly, and pivoted into a position of rest on the top cover when it is in its overturned position. That is, the first fastener means is of a type permitting the movement of the top cover and each of the transparencies about an axis lying in the plane of the transparency as well as about an axis intersecting the plane of the transparency, preferably perpendicular thereto.

In a preferred embodiment, the top and bottom covers have flanges depending inwardly toward the space between the covers when the covers are arranged in superimposing relationship which assist in retaining the transparencies within the storage device by restraining them from pivotal movement about the second fastener means. The flanges extend at least partially along opposed portions of the periphery of the top and bottom covers on each side of the second fastener means. Corresponding portions of the depending flanges are of a height sufficient to overlap one another so as to enclose those portions of the periphery of the space between the top and bottom covers.

Additional objects and advantages of the present invention will become apparent from the following detailed description of preferred embodiments thereof taken in conjunction with the drawings described below.

DESCRIPTION OF THE PREFERRED EMBODIMENT

Figure 1:
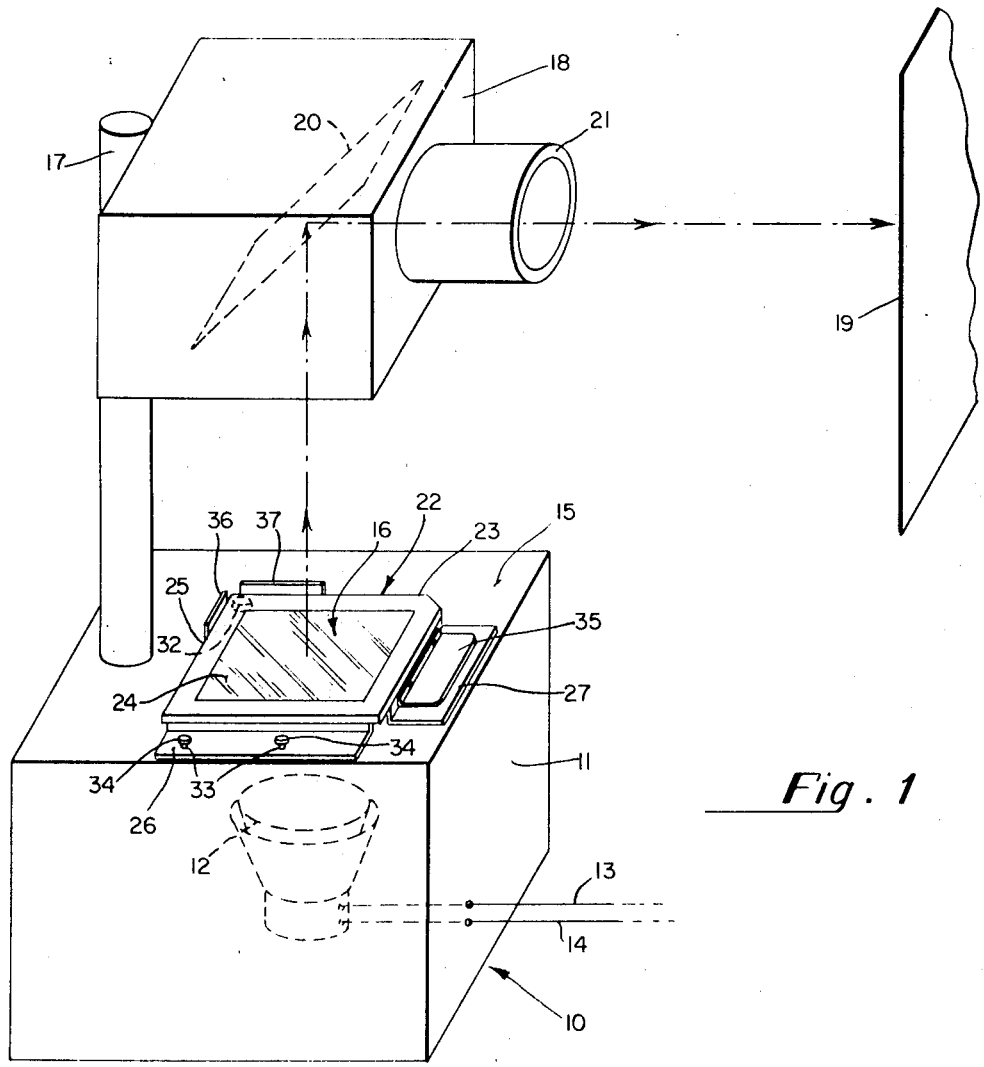
FIG. 1 is a perspective view of a staging assembly of the invention disposed upon the stage of an overhead projector.

Referring now to the drawings, FIG. 1 shows an overhead projector, indicated generally by reference numeral 10. Projector 10 has a base portion 11 in which a light source 12 is mounted. Wires 13 and 14 connect light source 12 to a suitably source of electric current. Base portion 11 has a horizontal upper surface 15 which comprises the stage of projector 10. Upper surface 15 has an opening 16 defined therein toward which light source 12 is directed. A support member 17 extends vertically upward from upper surface 15 of base portion 11. Support member 17 carries on its upper end a projection unit 10. Projection unit 18 contains a mirror 20 arranged at an angle of 45° to the horizontal which alters the upward path of light from light source 12 and directs it toward a screen 19 spaced from projector 10. A lens assembly 21 is disposed in the path of light reflected by mirror 20 and is adapted to focus light by movement of lenses contained therein to adjust and focus an image formed by the light on screen 19. Thus, projection unit 18 is adapted to direct light received from light source 12 toward screen 19 and, when an image is formed by the light passing through a transparency disposed on upper surface 15, to focus the image on screen 19.

Figure 2:
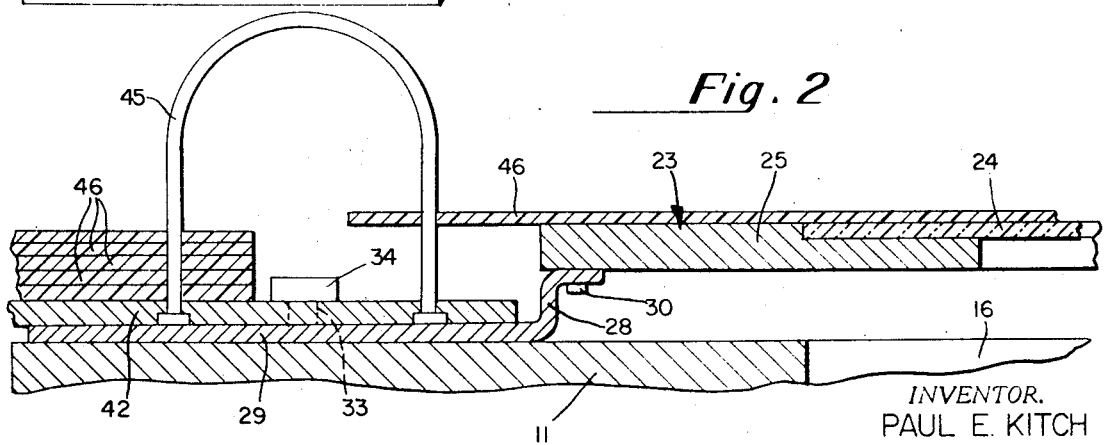
FIG. 2 is a fragmentary sectional elevation view through a portion of the staging assembly and a storage device attached thereto.

A staging assembly of the invention, indicated generally by reference numeral 22, is disposed upon the stage of projector 10 and generally over opening 16 in upper surface 15. Staging assembly 22 includes a panel 23 having a central transparent portion 24 capable of transmitting light received from light source 12 to mirror 20 and an outer frame portion 25 which supports the transparent portion 24. Transparent portion 24 is made of a transparent or translucent material such as plastic or glass. Frame portion 25 is preferably made of a relatively rigid material such as metal, wood or plastic. Transparent portion 24 corresponds generally in size and shape to opening 16 in upper surface 15 and may be secured to frame portion 25 by adhesive. It may overlie inner marginal portions of frame portion 25 and, if relatively thick, is preferably recessed into frame portion 25 as shown in FIG. 2 to form a smooth upper surface on transparent panel 23.

Figure 4:
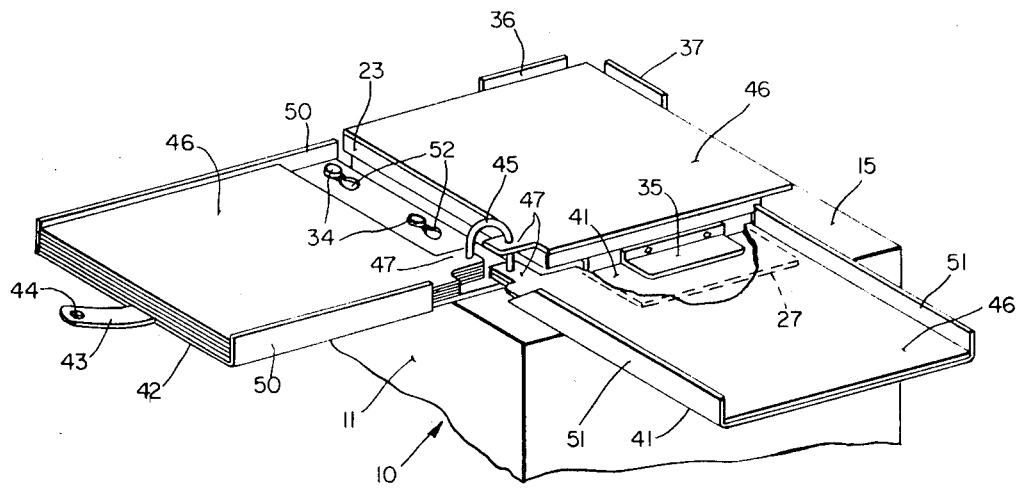
FIG. 4 is a perspective view of transparency display apparatus of the invention in which a transparency storage device of the invention is disposed in open position in engagement with a staging assembly of the invention positioned on the stage of an overhead projector.

Staging assembly 22 includes support flanges 26 and 27 attached thereto by bolts 30 which extend laterally from two adjoining sides of transparent panel 23. Support flanges 26 and 27 have a short downwardly extending leg 28 beneath panel 23 and secured thereto and a longer laterally depending leg 29, the lower surface of which rests on upper surface 15 adjacent opening 16. This structure is shown clearly in FIG. 2. These slightly elevate panel 23 above upper surface 15. The corner 31 of transparent panel 23 opposite flanges 26 and 27 is supported above upper surface 15 by a support member 32. Support flange 26 contains two upstanding pins 33 having radially enlarged heads 34 which cooperate with key-shaped holes on one cover of the storage device of the invention to form releasable attachment means which operate in a manner to be described. A clamp member 35 extends laterally outwardly from panel 23 above support flange 27 and serves to support the top cover of the storage device when it is opened and overturned to provide a platform for collecting transparencies after display. The free marginal edge of the cover is disposed between clamp member 35 and support flange 27 and is held in a cantilevered position by the clamp member 35 and the support flange 27 as shown in FIG. 4. Upstanding alignment flanges 36 and 37 are disposed along two adjoining sides of panel 23 and serve as transparency alignment means for aligning transparencies relative to one another and to panel 23 in a manner to be described.

It should be clearly understood that the construction of staging assembly 22 may be altered in many respects without departing from the spirit and scope of the invention. For example, panel 23, including transparent portion 24 and frame portion 25, might be made entirely of a single piece of transparent material such as plastic or glass. In addition the manner of attaching support flanges 26 and 27 to transparent panel 23 might be substantially different from that shown in FIG. 2. Also, the alignment flanges 36 and 37 may be disposed around different peripheral portions and to a greater or lesser extent of the periphery of panel 23. Moreover, the invention contemplates the display of transparencies having a shape other than rectangular, such as triangular or even circular.

Figure 3:
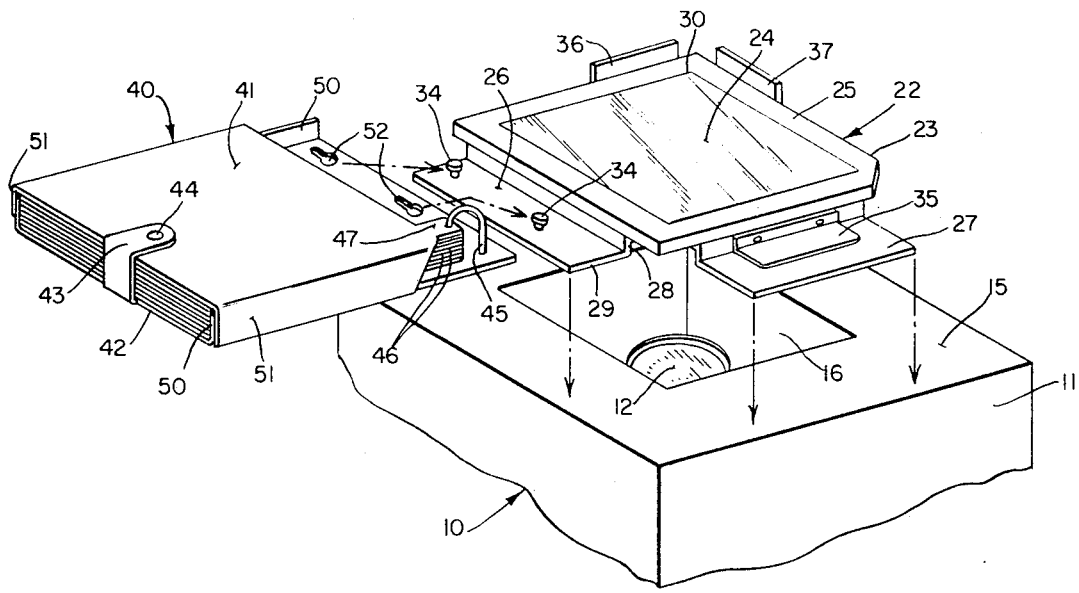
FIG. 3 is a perspective view of transparency display apparatus of the invention in which a transparency storage device of the invention is disposed in closed position in engagement with a staging assembly of the invention positioned on the stage of an overhead projector.

FIG. 3 illustrates a transparency storage device of the invention disposed in closed position and arranged for cooperative engagement with the staging assembly shown in FIG. 1 and described above. The storage device, indicated generally by reference numeral 40, includes a top cover 41 and a bottom cover 42. To provide support for transparencies when held by support flanges 26 and 27 as described above, the top and bottom covers 41 and 42 are preferably made of relatively stiff materials so that they have some beam strength and are capable of supporting at least the weight of a few transparencies in a cantilever arrangement. In instances where the upper surface 15 or horizontal stage of the projector 10 is of sufficient area from the periphery of opening 16 to the periphery of upper surface 15, the covers 41 and 42 may be of more flexible material since they may not be required to support weight in a cantilever manner during operation but rather may rest directly on upper surface 15. Also, other means for supporting covers 41 and 42 might be provided.

In the closed position, top cover 41 is superimposed over bottom cover 42. Bottom cover 42 has a strap 43 which extends upwardly and folds back onto the upper surface of top cover 41. Strap 43 has a snap fastener element 44 which engages a cooperative snap fastener element (not shown) secured to top cover 41 so that fastener means are provided for releasably securing top cover 41 to bottom cover 42 at at least this one point about the periphery of bottom cover 42. A fastener element 45 in the form of a hoop, the ends of which terminate and are releasably attached as by threaded bolts to bottom cover 42, is disposed about the periphery of bottom cover 42 at one end of the side opposite strap 43 and extends upwardly from bottom cover 42. One leg of the hoop of element 45 passes through a hole in top cover 41. In this manner, top cover 41 is secured to bottom cover 42 at a point peripherally spaced from the point where strap 43 secures the covers together. The fastener element 45 is adapted to secure top cover 41 to bottom cover 42 while allowing the top cover 41 to be overturned and moved out of superimposed relationship with the bottom cover 42 when the second fastener means, that is, the snap fastener elements on strap 43 and top cover 41, are released. The nature of the movement permitted is illustrated by FIG. 4 in which the storage device 40 is shown in its open position.

A plurality of transparencies 46 are disposed between the top and bottom covers 41 and 42 and attached to the storage device 40 by fastener element 45, one leg of which passes through a hole in one corner of the transparencies 46 as well as through top cover 41. In this manner, transparencies 46 may be overturned and moved out of superimposed relationship with the bottom cover 42 in a manner similar to movement of top cover 41 described above. To facilitate handling of top cover 41 and transparencies 46 in the manner shown in FIG. 4, a pivot extension or flap 47 is preferably formed into or attached to each of top cover 41 and transparencies 46 through which a leg of hoop-shaped fastener element 45 passes to secure them together in the manner described above. This flap 47 allows the cover 41 and transparencies 46 to be moved about panel 23 without interference between panel 23 and the side edges thereof.

Top cover 41 and bottom cover 42 have flanges 50 and 51, respectively, extending along two opposed sides of the covers between the first and second fastener means and depending inwardly toward one another and toward the space between the covers when the covers are arranged in superimposing relationship and storage device 40 is in its closed position. Flanges 50 and 51 preferably should extend at least partially along opposed portions of the periphery of the top and bottom covers 41 and 42 on each side of fastener means 45. For reasons presented below, the flanges should not extend along the portion of the periphery of the storage device 40 adjacent staging assembly 22 during use. Corresponding portions of the depending flanges, that is, portions of flanges 50 and 51 which oppose one another when storage device 40 is in the closed position, preferably should have a height sufficient to overlap one another so as to enclose the periphery of the space between the top and bottom covers 41 and 42 along portions thereof where flanges 50 and 51 overlap. Thus, the height of flanges 50 and 51 will vary depending upon the number of transparencies 46 to be carried in the storage device 40 and the desired thickness of storage device 40.

Bottom cover has key-shaped slots 52 disposed along one side adjacent fastener means 45. Key-shaped slots 52 are adapted to receive the enlarged heads 34 of pins 33 on support flange 26 at one end thereof and, upon lateral movement of storage device 40, key-shaped slots 52 cooperate with pins 33 and heads 34 to form a releasable attachment means which releasably attaches storage device 40 to staging assembly 22. The manner in which this releaseable attachment occurs is shown clearly in FIGS. 2, 3 and 4.

FIG. 4 shows the manner of operation of the transparency storage device and staging assembly of the invention. Strap 43 may be released and top cover 41 may be moved out of superimposing relationship with bottom cover 42 and overturned and pivoted about fastener element 45 into a position of rest upon support flange 27 of staging assembly 22. It is held in position by clamp member 35 over support flange 27. The top cover 41 serves as a cantilever support for carrying transparencies 46 moved out of superimposing position with bottom cover 42 and onto top cover 41 after their display upon the staging assembly 22 of the invention. Thus, one of the broader aspects of the invention is that the storage device contains a plurality of transparencies 46 which are attached to the storage device 40 in a manner permitting movement of individual transparencies 46 about an axis lying in the plane of the transparency as well as about an axis intersecting the plane of the transparency and preferably perpendicular thereto as in the embodiments shown. If pivoted about an axis not perpendicular to the plane of the transparency, the transparency must be flexed or bent slightly to permit the required movement.

It can be seen that this arrangement allows the order of display of transparencies on the staging assembly to be varied at the will of the operator in that no prescribed order need be followed. Those transparencies 46 which are not to be shown are simply pivoted out of position and supported on top cover 41. Removal of transparencies 46 being displayed on panel 23 before subsequent transparencies 46 are placed on top cover 41 is not required which is a distinct advantage of the invention. However, the invention also maintains the transparencies 46 in a predescribed order which is oftentimes desired.

The storage device 40 is adapted to be removed from the staging assembly 22 of the invention and, upon closure of strap 43, forms a booklike unit which can be used to transport and store transparencies 46 in a protected condition. In this respect the staging assembly 22 may be used in conjunction with a large number of storage devices 40, each of which contains a different set of transparencies 46.

The storage device 40 is most advantageously used in conjunction with a staging assembly 22 of the invention. However, its use is not restricted in this respect and it can be used with a large variety of overhead projectors and with other staging assemblies. In some instances it might be employed directly upon the upper surface 15 of the projector 10 in which case, as mentioned earlier, if upper surface 15 is sufficiently large, covers 41 and 42 can rest on surface 15 and need not support a load in cantilever position.

Construction of storage device 40 may be varied to accommodate transparencies of a different size and shape. Additional releasable fastener elements and straps 43 or other means might be employed to releasably secure top cover 41 to bottom cover 42. If such straps are placed about the periphery of bottom cover 42, no flanges 50 and 51 are necessary to retain the transparencies within storage device 40. Flanges 50 and 51 may be omitted even where only strap 43 and fastener means 45 are employed since the edges of the transparencies 46 will contact strap 43 when they pivot about fastener means 45. However, for greater protection of transparencies during transport and storage, flanges 50 and 51 are preferably included.

Numerous changes and modifications in the specific embodiments of apparatus described above are contemplated and are intended to be included within the scope of the invention. For example, different means of aligning transparencies upon the staging assembly 22 may be employed such as pins extending upwardly along a margin of panel 23 and adapted to match registration holes in the transparencies. Other types of fastener elements might be substituted for fastener element 45 which would permit a similar type of movement of transparencies 46 about two axes. Such fastener elements are preferably releasable so that worn transparencies can be removed and new ones inserted in the storage device.

The surface of panel 23 is preferably elevated slightly above the upper surface of support flanges 26 and 27. It has been found that this facilitates the display of transparencies in a flat condition since the corner of the transparency overlying other transparencies in the area adjacent fastener element 45 is not held above the level of the remainder of the transparency being displayed. Therefore, the visual distortion due to inability to focus the projected image, which would otherwise occur, is not present. For this reason, it is preferred that the upper surface of panel 23 be supported above the upper surface of the support flanges 26 and 27 for a distance of at least as great as the thickness of one of the top or bottom covers 41 and 42, and the combined thickness of the plurality of transparencies.

As mentioned above, a notable feature of the storage device of the invention is the provision of fastener element 45 which allows a transparency 46 to be moved from a position overlying bottom cover 42 selectively into a display position over panel 23 or into a position of rest over top cover 41 resting on support flange 27. The order of display may be varied at will and the showing of certain transparencies conveniently avoided if desired, without change the fixed order of transparencies in the storage device.

What is claimed is:

1. A staging assembly adapted to facilitate display of transparencies upon an overhead projector having a horizontal stage disposed above a light source, said assembly comprising:
    a transparent panel adapted to be positioned on the horizontal stage over the light source of an overhead projector,
    support flange means extending laterally from a portion of the peripheral side of said panel, said flange means having releasable attachment means along one portion thereof,
    a clamp member extending laterally from a portion of the peripheral side of said panel above a portion of said support flange means offset from said releasable attachment means, said clamp member being closely spaced from said support flange means, and alignment means disposed along a portion of the peripheral side margins of said panel and adapted to register transparencies disposed thereon in superimposing relationship by edge contact with the transparencies, 2. A staging assembly according to claim 1, wherein said alignment means comprise an upstanding flange depending upwardly above the surface of said panel about at least a portion of the periphery thereof.

3. A staging assembly according to claim 1, wherein said releasable attachment means comprise upstanding pins having radially enlarged portions on their upper end.

4. A staging assembly according to claim 1, wherein said upper surface of said panel is disposed above the upper surface of said support flange means.

* * * * *